United States Patent
Willis

(10) Patent No.: US 6,173,115 B1
(45) Date of Patent: Jan. 9, 2001

(54) RECORD DURING PAUSE AND PLAYBACK WITH REWRITABLE DISK MEDIUM

(75) Inventor: Donald Henry Willis, Indianapolis, IN (US)

(73) Assignee: Thomson Licensing S.A., Boulogne Cedex (FR)

( * ) Notice: Under 35 U.S.C. 154(b), the term of this patent shall be extended for 0 days.

(21) Appl. No.: 09/433,434

(22) Filed: Nov. 4, 1999

(51) Int. Cl.[7] .............................. H04N 5/781; H04N 5/76
(52) U.S. Cl. .............................................. 386/125; 386/46
(58) Field of Search ................................... 386/125, 124, 386/126, 46, 83, 106, 1, 45, 52, 4, 40, 82, 81, 69, 70; H04N 5/781, 5/76

(56) References Cited

U.S. PATENT DOCUMENTS 5,701,383 * 12/1997 Russo et al. ............................ 386/46
5,999,694 * 12/1999 Yasuda et al. .......................... 386/70

* cited by examiner

*Primary Examiner*—Robert Chevalier
(74) *Attorney, Agent, or Firm*—Joseph S. Tripoli; Joseph J. Laks; Harvey D. Fried

(57) ABSTRACT

A method for recording a program during pausing and playing back the program utilizing a disk medium, comprising the steps of: upon initiating a pause, recording the program onto a disk medium as a first pattern of recorded segments alternating with a second pattern of unrecorded segments; jumping back to the first recorded segment of the first pattern upon termination of the pause; and, alternately playing back the recorded segments of the first pattern and recording the program onto the unrecorded segments of the second pattern. An apparatus for implementing the method can comprise a controller having: a first mode of operation for recording the first pattern initiated responsive to a command to initiate a pause; a second mode of operation initiated responsive to a command to terminate said pause and jump back; and, a third mode of operation for playing back the first pattern and recording the second pattern.

18 Claims, 9 Drawing Sheets

ALTERNATE RECORDING/PLAYBACK

| PLAYBACK | LINES | RECORD | LINES |
|---|---|---|---|
| SEGMENT A | 1-43, ODD | SEGMENT A | 1-43, ODD |
| SEGMENT B | 2-44, EVEN | SEGMENT B | 2-44, EVEN |
| SEGMENT C | 3-45, ODD | SEGMENT C | 3-45, ODD |
| SEGMENT D | 4-46, EVEN | SEGMENT D | 4-46, EVEN |
| ⋮ | ⋮ | SEGMENT E | 5-47, ODD |
| | | ⋮ | ⋮ |

FIG. 13

PRECESSION

| PATTERN | FIRST SEGMENT RECORDED |
|---|---|
| A | 1 |
| B | 2 |
| C | 3 |
| D | 4 |
| E | 5 |
| ⋮ | ⋮ |

FIG. 14

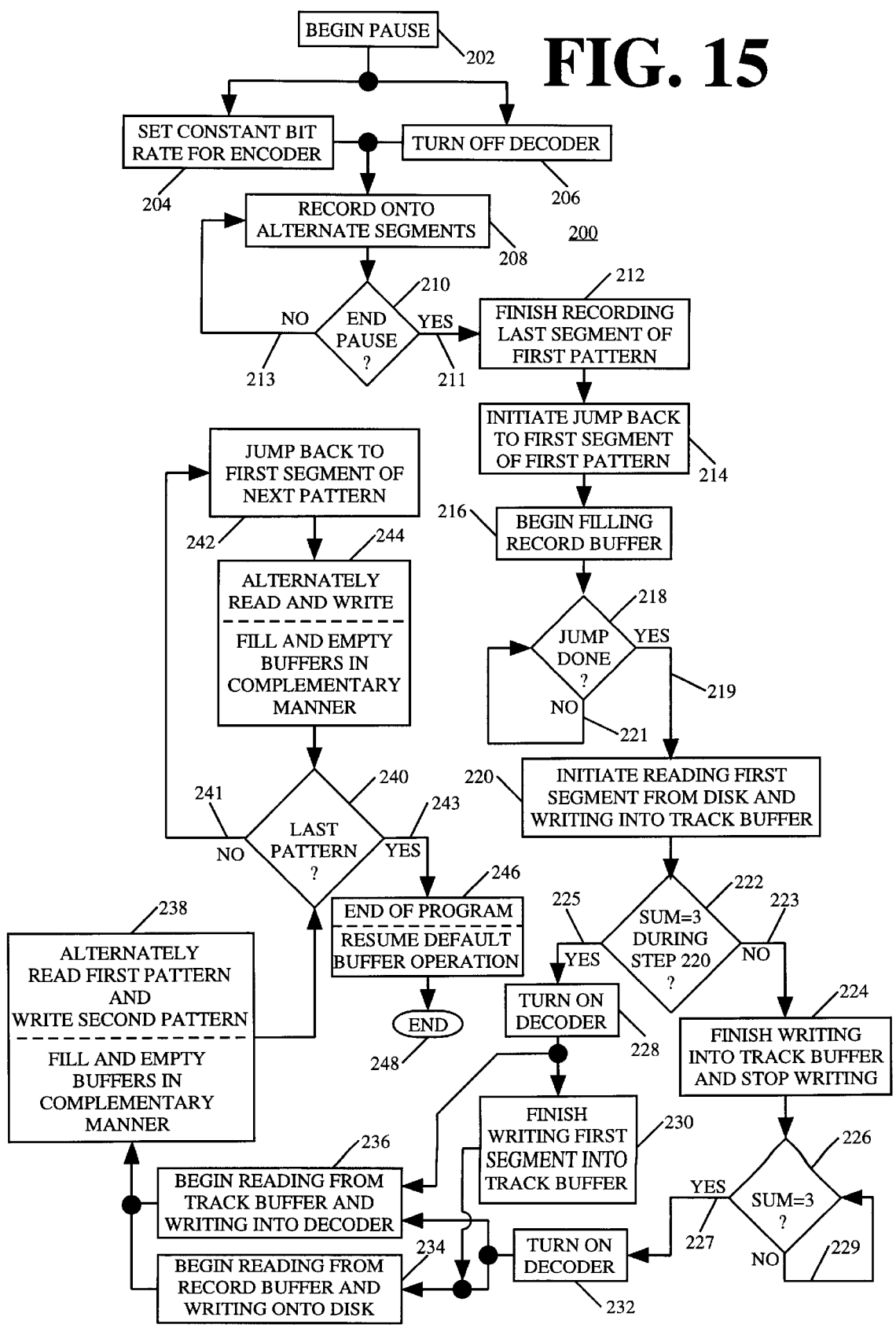

RECORD DURING PAUSE AND PLAYBACK WITH REWRITABLE DISK MEDIUM

BACKGROUND OF THE INVENTION

This invention relates generally to methods and apparatus providing advanced operating features for audio and/or video programs recorded on disk media, for example recordable digital video disks.

Various devices have been developed to enable consumers to record video and audio programs for later presentation. Such devices include tape recorders, video cassette recorders, recordable compact disks, and most recently, recordable digital video disks (DVD). A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded, that is overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technology. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and with out any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

A desirable feature in a DVD device would enable a viewer and/or listener to initiate resumption of the program presentation as soon as the interruption or pause has ended, without sacrificing the program content during the interruption or pause.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales. Such novel DVD features should include the ability to simultaneously view and record on a disk medium in a seamless fashion, without the high operating speed of a computer hard drive. A recordable DVD device with a single head for reading and writing cannot read and write simultaneously. Accordingly, the terms seamless and simultaneous are used herein to denote that recording and playing back program material in accordance with the inventive arrangements has the appearance of being simultaneous to the viewer and/or listener, even though the functionality is actually alternating or multiplexed.

Repeated recording in the same section of the disk can exhaust the lifetime of the disk prematurely. It is desirable when implementing novel features, particularly features that can require large amounts of overwriting, to prevent repeated recording in the same sections of a rewritable DVD to prevent premature exhaustion.

A basic rewritable DVD device, having for example a 1× (one times) read and a 1× (one times) write capability, typically has maximum data rates for recording or playing back of only approximately 11 megabits/second. Accordingly, it is desirable to provide novel features that can be implemented within the constraints of the maximum available data rates.

SUMMARY OF THE INVENTION

A method in accordance with the inventive arrangements for recording a program during pausing and playing back the program, utilizing a disk medium, comprises the steps of: (a) upon receiving a command to initiate a pause, recording the program onto a track on the disk medium as a first pattern of recorded segments alternating with a second pattern of unrecorded segments; (b) jumping back to the first recorded segment of the first pattern upon receiving a command to terminate the pause; and, (c) alternately playing back the recorded segments of the first pattern and recording the program onto the unrecorded segments of the second pattern.

An apparatus in accordance with other the inventive arrangements, for recording a program during pausing and playing back the program utilizing a disk medium, can comprise: a first signal processing path for receiving the program; a pickup assembly for writing data onto the disk medium and reading data from the disk medium; a servo system for the pickup assembly; a second signal processing path for playing back the program; means for receiving control commands; a controller having a first mode of operation for recording the program initiated responsive to a command to initiate a pause, a second mode of operation initiated responsive to a command to terminate the pause and a third mode of operation for playing back and recording the program; in the first mode of operation, the pickup assembly being positioned to record the program onto a track on the disk medium as a first pattern of recorded segments alternating with a second pattern of unrecorded segments; in the second mode of operation, the pickup assembly being jumped back to the first recorded segment of the first pattern; and, in the third mode of operation, the pickup assembly being positioned for alternately playing back the recorded segments of the first pattern and recording the program onto the unrecorded segments of the second pattern.

In accordance with the inventive arrangements, a record during pause and playback feature is provided for a device for rewriting on a disk medium, as is a method for recording during a pause while operating a device for rewriting on a disk medium. The presently preferred disk medium is a rewritable DVD and the presently preferred device is a rewritable DVD device. A viewer or listener can pause or interrupt presentation of a program, and advantageously initiate resumption of the program presentation as soon as the interruption or pause has ended, without sacrificing the program content during the interruption or pause. Moreover, the viewer or listener does not have to wait for the remainder of the program to be recorded before viewing the program.

In accordance with further aspects of the inventive arrangements, the apparently simultaneous recording and playing back is advantageously transparent, or at least substantially transparent, to the viewer or listener. The rewritable DVD device and corresponding method enable the program presentation to be played back to the viewer or listener from the moment the pause began. The rewritable DVD device will simultaneously record for a period of time corresponding to the length of the pause, unless of course the program ends first.

Finally, in accordance with the inventive arrangements, the techniques that enable apparently simultaneous recording and viewing (playing back) in a pause mode advantageously promote a maximum useful re-recording lifetime for a rewritable DVD by precessing along the track of the rewritable DVD as the recording and playing back progress

BRIEF DESCRIPTION OF THE DRAWINGS

FIG. 13 is a table summarizing the alternate recording/playback illustrated in FIGS. 3–12.

FIG. 14 is a table summarizing the precession illustrated in FIGS. 3–12.

FIG. 15 is a flow chart useful for explaining buffer management for a rewritable DVD device in accordance with the inventive arrangements.

DETAILED DESCRIPTION OF THE PREFERRED EMBODIMENTS

Figure 1:
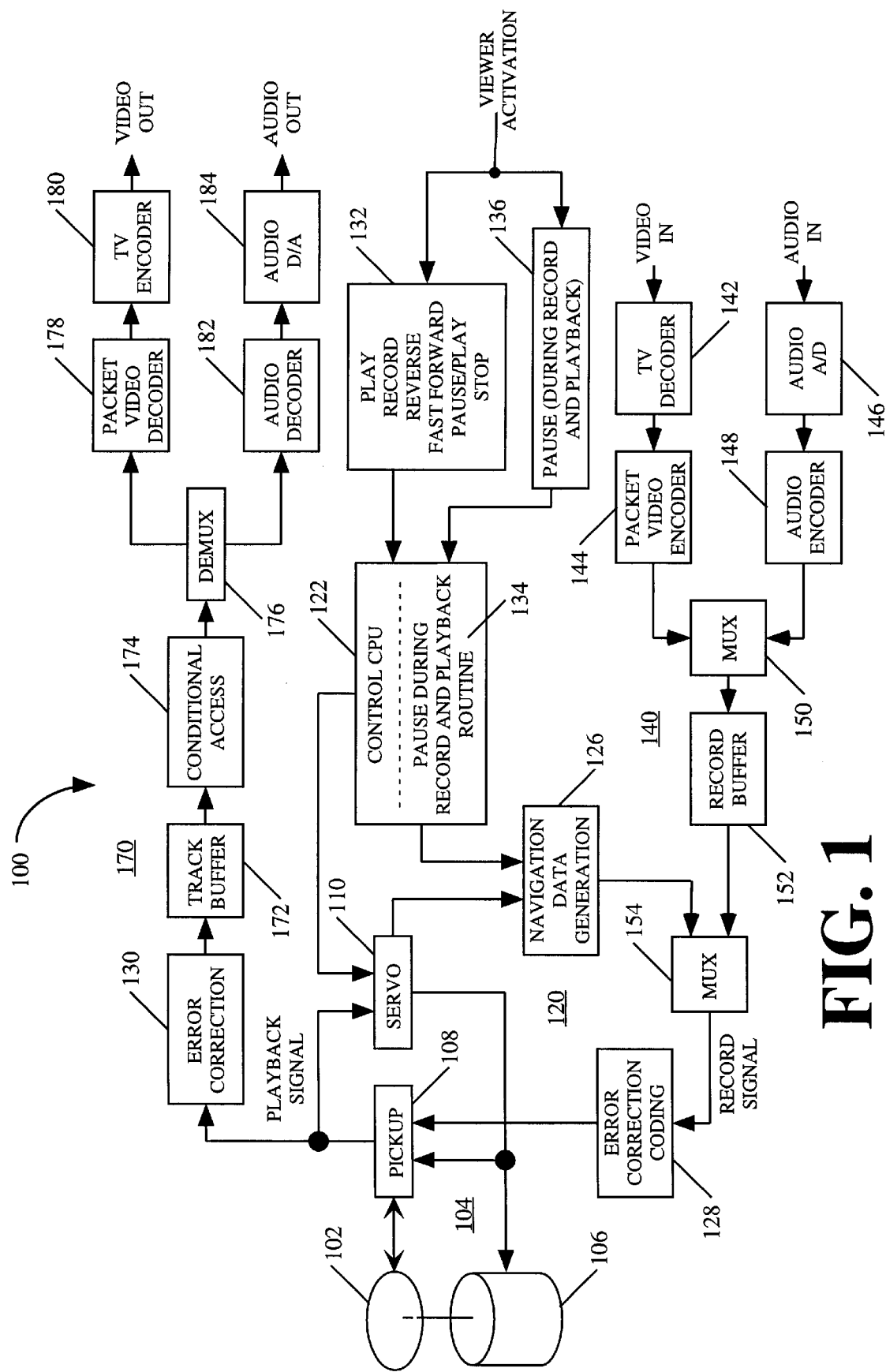
FIG. 1 is a block diagram of a rewritable DVD device having a record during pause and playback function in accordance with the inventive arrangements.

A device 100 for implementing a record during pause and playback utilizing a rewritable disk medium 102 in accordance with the inventive arrangements is shown in block diagram form in FIG. 1. The rewritable disk medium 102 is embodied as a rewritable DVD. The device 100 is capable of writing onto and reading from the rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disk. A laser on the pickup assembly burns spots onto a spiral track on the disk or illuminates spots already burned onto the track for recording and playing back video and/or audio program material. For purposes of understanding the invention, it is irrelevant whether the disk is recordable on one or two sides, or in the event of a double-sided recording, whether the double-sided recording, or subsequent reading from the disk, takes place from the same side of the disk or from both sides. The pickup and the motor are controlled by a servo 110. The servo 110 also receives the Playback Signal of data read from the spiral track of the disk 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

A control buffer 132 for viewer activatable functions indicates those functions presently available, namely play, record, reverse, fast forward, pause/play and stop. The pause is a counterpart to pause operation in a VCR, for example interrupting the play back of a prerecorded program or interrupting the recording of a viewed program to eliminate commercials from the recording. A special record during pause and playback function, labeled Pause (during Record and Playback), is illustrated as part of a separate buffer 136 to emphasize this aspect of the inventive arrangements.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of the disk is an ECC (error correction code) block of 16 sectors, where each sector includes 2048 bytes of user data. A group is an integer number of EEC blocks, for example 12. Each group of blocks represents approximately 0.5 seconds of combined video and audio program material. The amount of linear space along the spiral track needed to record a group of EEC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises a track buffer, or output buffer, 172, in which data read from the disk is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

In accordance with the inventive arrangements, the record buffer 152 in input path 140 is advantageously much larger than would otherwise appear to be necessary. In the presently preferred embodiment, the record buffer is sufficiently large enough to store approximately 1.5 seconds of a video and audio data presentation. Also in accordance with the inventive arrangements, the track buffer 172 in output path 170 is also advantageously much larger than would otherwise appear to be necessary. In the presently preferred embodiment, the track buffer is also sufficiently large to store approximately 1.5 seconds of a video and audio data presentation. The larger record and track buffers are advantageously provided to accommodate the longest possible jumps of the pickup assembly 108 during recording and playing back in accordance with the inventive arrangements. As will be explained in further detail, the longest possible jumps of the device 100 are approximately 0.9 seconds. The cost of the improved features taught herein thus advantageously has a minimal impact, if any, on the cost of manufacturing an improved rewritable DVD device.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

Device 100 can represent a machine having, for example, a 1× read and 1× write capability. Such devices can typically have maximum data rates for recording or playing back of approximately 11 megabits/second. In order to implement the record during pause and playback function, it is necessary to play back (read) and record (write) in a manner that appears to be simultaneous. The maximum data rates available of approximately 5 megabits/second for playing back (reading) and 5 megabits/second for recording. Such rates are only half the minimum rate of a machine of minimal capability, and accordingly, apparently simultaneous playing back and recording with such a machine would seem to be impossible. Nevertheless, such a minimal capability machine can be advantageously operated in accordance with the inventive arrangements to provide apparently simultaneous playing back and recording as is necessary to implement the record during pause and playback function by advantageous management of the record and track buffers. It will also be appreciated that the inventive arrangements can also be useful for devices having higher data rates.

A record during pause and playback (or pause during record and playback) feature is very desirable in a rewritable DVD device. Such a function can be utilized, for example, when a viewer is watching a television program and is interrupted by a visitor or a phone call. During the time the viewer is unavailable, the recorder continues to record the program. After some period of time, for example anywhere from one or two minutes to 30 minutes or longer, the viewer will want to resume viewing the program from the point at which viewing was interrupted. At this point, the device must start playing back the recording from the beginning of the pause, while continuing to record the incoming program material. This apparently simultaneously playing back and recording would normally require large jumps between the recording area and the playing back area of the spiral track, which would need to be made repeatedly as often as the video recorder alternated between playing back and recording. It should be emphasized that when the jumps occur, neither reading nor writing can occur. Thus, jumps of any kind cause the average bit rate to decrease. The longer jumps are and the more frequently jumps occur, the greater the decrease in the average bit rate.

In accordance with the inventive arrangements, a method is provided for recording and playing back after a pause that advantageously minimizes the amount of time that neither writing nor reading can occur. The method thus advantageously minimizes the length and the number of long jumps as much as possible without precluding implementation of the record during pause and playback feature. Innovative buffer management and bit rate management can compensate for those jumps that cannot be avoided. The feature is thus more tolerable to the viewer because the playback can be substantially, if not completely seamless. During a pause, program material is advantageously recorded in short segments, for example equivalent to two or three rotations of the disk, leaving spaces in between the segments that are at least as long or slightly longer than the recorded segments. When the pause ends, a jump back can be made to the start of the recording corresponding to the beginning of the pause, so that the recording can begin playing back. As each of these recorded segments is played back, the spaces in between the recorded segments can be used to record the incoming program material. Eventually, another jump back must be made after another time interval equal to the original pause has passed. In this way, potentially long jumps can advantageously be avoided except for those jump backs made at the period of the pause. In other words, if a pause is 10 minutes long, then the playback after the pause terminates will require a jump back long enough to accommodate 10 minutes of recorded program material. Such a jump back will be necessary every 10 minutes until the recording and playback of the program is complete. Buffer memories of sufficient length can advantageously be used to store the encoded program material that is waiting to be recorded while reading played back material off of the disk, and for supplying played back material to the decoders while material is being recorded on the disk. The buffers are also used to play back and record program material during the jumps. At the same time, the bit rates of the encoder and decoder can be controlled during implementation of the feature to provide sufficient bit rate capability to implement the desired buffer management. The encoders and decoders can operate, for example, according to the MPEG-2 standard.

Figure 2:
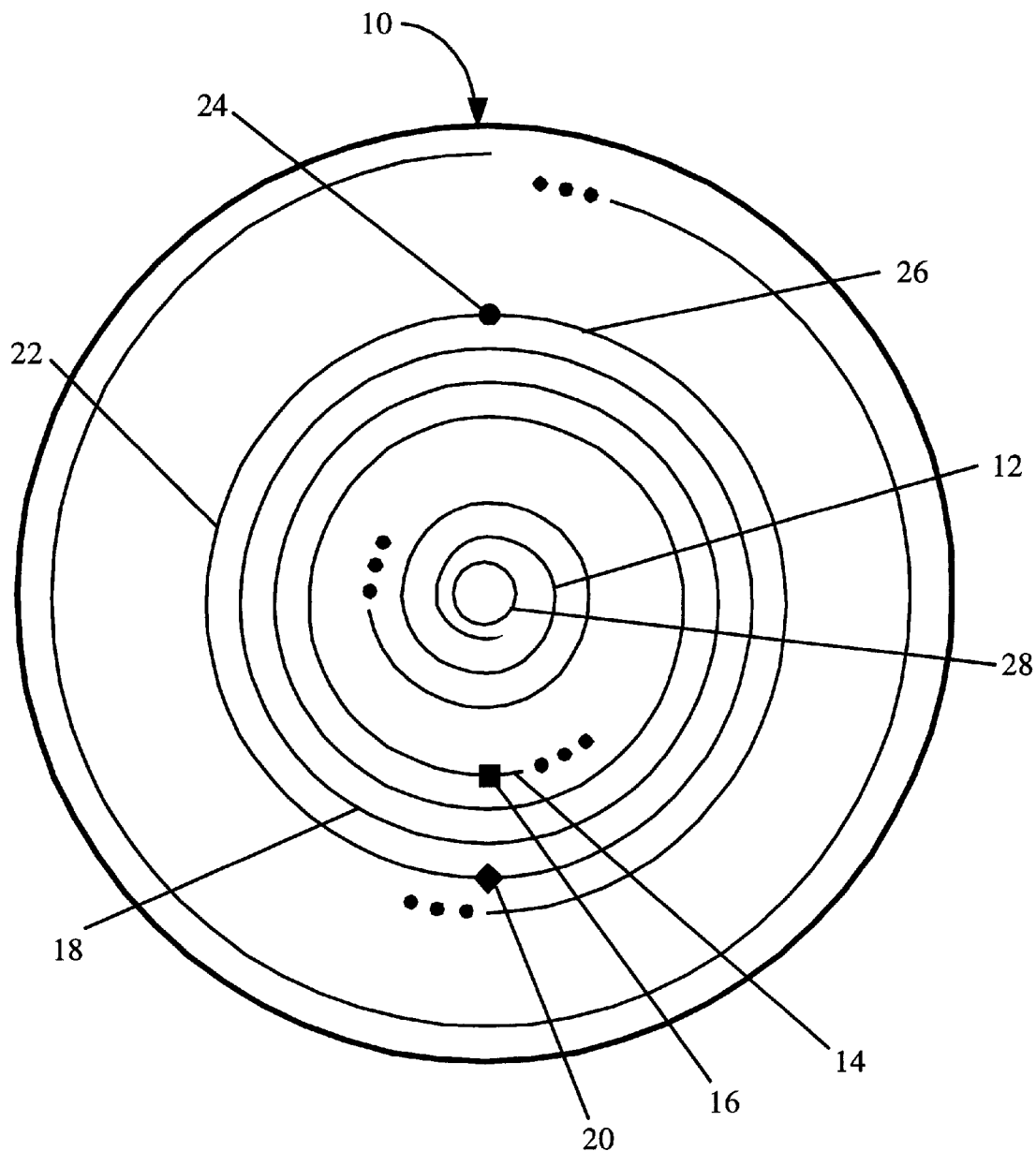
FIG. 2 is a diagram useful for illustrating how recordable segments in accordance with the record during pause and playback function of the inventive arrangements relate to a spiral track on a rewritable DVD.

For purposes of the inventive arrangements, program material is recorded onto a rewritable DVD and played back from a rewritable DVD in segments as noted above. Each segment represents a certain linear length or interval of the spiral track, as illustrated in FIG. 2. A rewritable DVD 10 is suitable for use as disk 102 in device 100. The disk has a continuous spiral track 12 that begins near a hole 28 in the middle of the disk and spirals outwardly. The track may also have a side-to-side wobble, not shown in the drawing, to accommodate media type indexing. Due to difficulties of scale only portions of the track 12 are shown, and these are shown in greatly enlarged scale. The direction of recording on the track is typically outwardly along the track, from a smaller radius part to a larger radius part. The several series of three large dots (● ● ●) denote portions of the track not shown in the drawing.

Reference numeral 14 denotes a recorded segment during a pause, in accordance with the inventive arrangements. Square 16 denotes the end of the recorded segment. Square 16 also denotes the beginning of an unrecorded segment 18. The end of the unrecorded segment 18 is denoted by diamond 20. Diamond 20 also denotes the beginning of an optional guard band 22, which can be shorter than the recorded and unrecorded segments. The end of the optional guard band 22 is denoted by circle 24. Circle 24 also denotes the beginning of the next recorded segment 26. The guard band can be provided to assure that segments are not unintentionally overwritten if the rewritable DVD device cannot switch quickly enough between playing back and recording. Operation without the guard band is preferable, when not needed, in order not to lose recording capacity.

Figure 3:
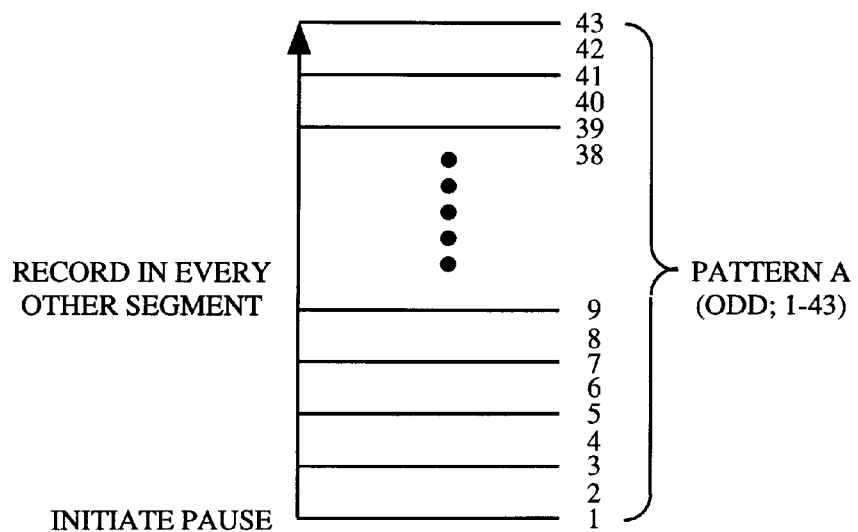
FIGS. 3–12 sequentially illustrate a method in accordance with the inventive arrangements for implementing a record during pause and playback function in accordance with the inventive arrangements.

The pause-while-recording method is sequentially illustrated in FIGS. 3–14. The numbered horizontal lines or spaces represent segments of the spiral track. The first numbered segment is not necessarily the first segment on the track, but is the first segment recorded when the pause function has been initiated. As shown in FIG. 3, segment 1 corresponds to initiating the pause. Thereafter a pattern A of alternating recorded and unrecorded segments is made on the track. The recorded segments are the odd numbered segments 1–43. The even numbered segments 2–42 are unrecorded. Guard bands are not illustrated, but can be considered to be an unrecorded segment that is longer than a recorded segment. Twenty-two segments are shown as being recorded in FIG. 3. Each segment represents approximately 0.5 seconds of program material, and accordingly, the illustrated pause is approximately 11 seconds in length. Irrespective of the length of the pause, pattern A continues until the pause is terminated. If the viewer fails to terminate the pause, a control routine can be provided to terminate the pause, for example when the last segment on the track has been recorded or the program ends.

Figure 4:
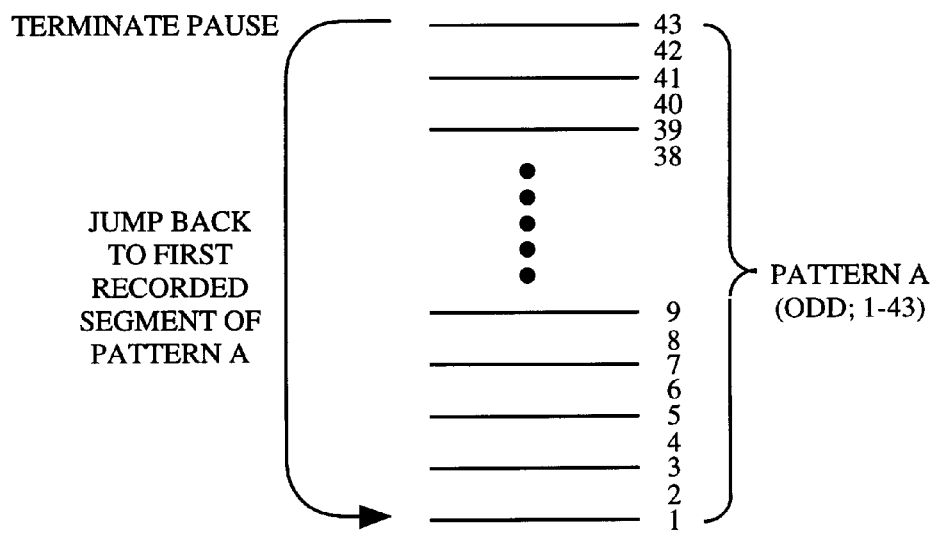

When the pause is terminated as shown in FIG. 4, the device must first finish writing of the segment being written onto the disk medium before jumping. The last recorded segment in FIG. 3 is segment 43. If the termination occurs during the skipping of segment 42, for example, then segment 43 must be recorded in full. The pickup assembly jumps back to segment 1. After this jump, it is desirable to begin playing back while recording, in such a way that no program material is lost. This requires an initialization of the innovative buffer management method. Understanding this method requires an appreciation of the starting conditions of the device when the pause is terminated. During recording, no program material is being read from the disk medium. No program material is thus available to be written into the track buffer 172, and no program material is available to be read out of the track buffer and played back to the viewer through the playback path 170. In short, the track buffer 172 is empty. At the same time, encoded program material is being propagated through the record buffer 152 and written onto the disk as quickly as the alternating pattern and the bit rate permit. The peak bit rate in the illustrated embodiment is 11 megabits/second. Accordingly, the record buffer 152 is empty or nearly empty.

In order for the alternate reading and writing of the disk medium to occur during apparently simultaneously playing back and recording of the program material, the track buffer must have enough program material stored therein to be played back during writing onto the disk medium. Similarly, the record buffer must be sufficiently empty to store enough program material when data is being read from the disk medium to avoid losing data. In accordance with the inventive arrangements, it has been determined that respective input and output path buffers are needed capable of storing three segments of program material, equivalent to approximately 1.5 seconds of program material. Buffers of this size will enable seamless operation of the pause during record and playback feature in device 100, and other devices of comparable data rates.

At the instant a pause is terminated, the necessary buffer conditions are not satisfied. Moreover, some bit rate capability must be available to initialize the buffers after the pause is terminated. Accordingly, once the pause is initiated the bit rate for the encoder is set to a constant bit rate. The decoder must decode at a rate corresponding to the bit rate during encoding, and accordingly, the decoder will automatically operate at the encoding frequency and need not be set to a specific value. In the presently preferred embodiment the constant bit rate is 5 megabits/second, in each case. This leaves approximately 1 megabit/second of bit rate capability (11 megabits/second less 2×5 megabits/second) to control the buffers.

Figure 5:
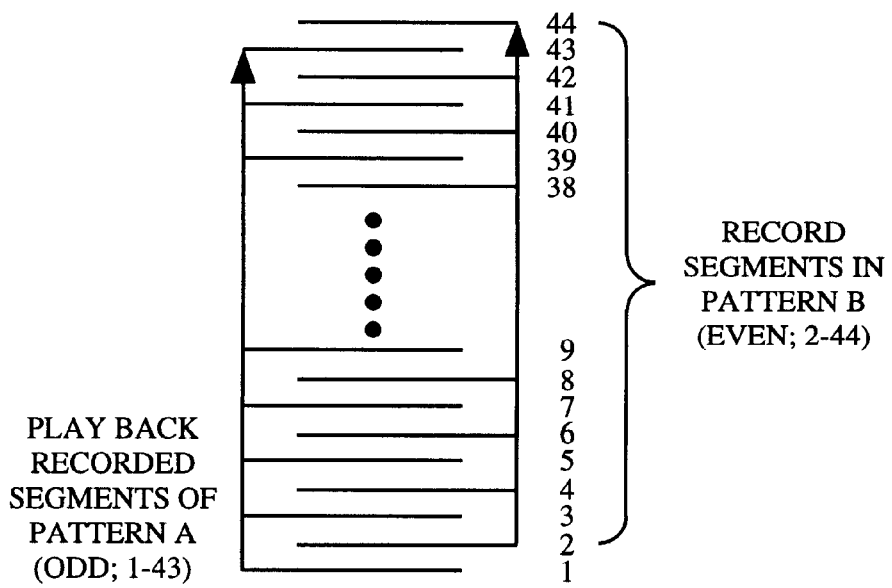

The jump after termination of the pause is illustrated in FIG. 4. This jump can be thought of as the first jump. As soon as the first jump commences, writing onto the disk medium is not possible. However, the encoder still provides an output, although at the reduced and constant bit rate of 5 megabits/second. Accordingly, program material that will become segments of pattern B illustrated in FIG. 5 are sequentially stored in the record buffer 152. As soon as the jump ends, and while the record buffer continues to fill, the first segment of pattern A is read from the disk medium and stored in the track buffer 172.

The extra bit rate capability enables a steady state of buffer operation to be reached, wherein filling and emptying of the record and track buffers is always complementary. In other words, the input buffer is filled as the output buffer is emptied, and vice versa. Also, the sum of the data in the two buffers, as a percent of capacity, is always substantially constant. If one buffer is ⅓ full, for example, the other buffer is ⅔ full. If one buffer is ½ full, the other buffer is also ½ full. If each of the buffers can hold three segments, as in the presently preferred embodiment, the sum of the number of segments in both buffers at the same time must be constant and must be equal to three.

FIG. 5 illustrates reading the segments 1–43 of pattern A and writing the segments 2–44 of pattern B, which occurs in an alternating sequence once the steady state operation of the buffers has been achieved.

Figure 6:
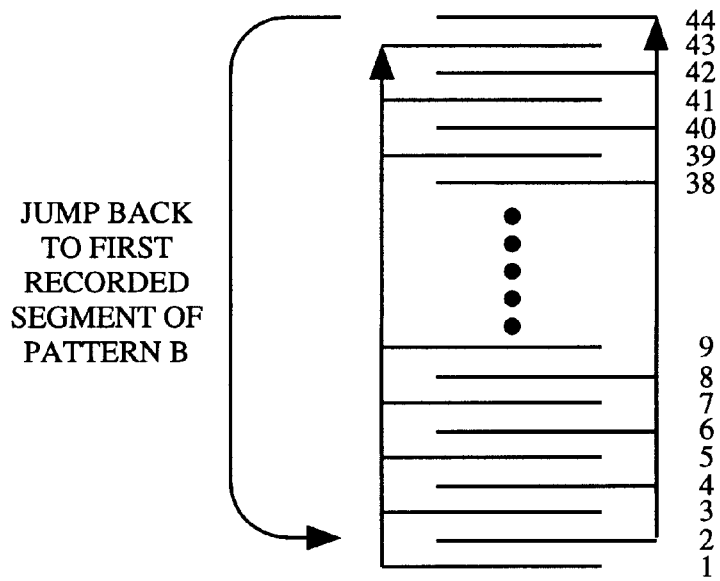

FIG. 6 represents a second jump back, and in fact, represents all remaining jumps back. When the first jump occurs from segment 43 to segment 1, the buffers are not initialized. When the second jump occurs from segment 44 to segment 2, the buffers are already initialized and operating in a complementary manner. Accordingly, after the second jump commences, the track buffer is full enough for segments to be read out and for playback to continue uninterrupted, that is seamlessly, during the jump. At the same time, the record buffer is empty enough for encoded segments to be stored during the jump, preventing the loss of data. Recording and playing between jump backs has a time period equal to the length of the pause.

Figure 7:
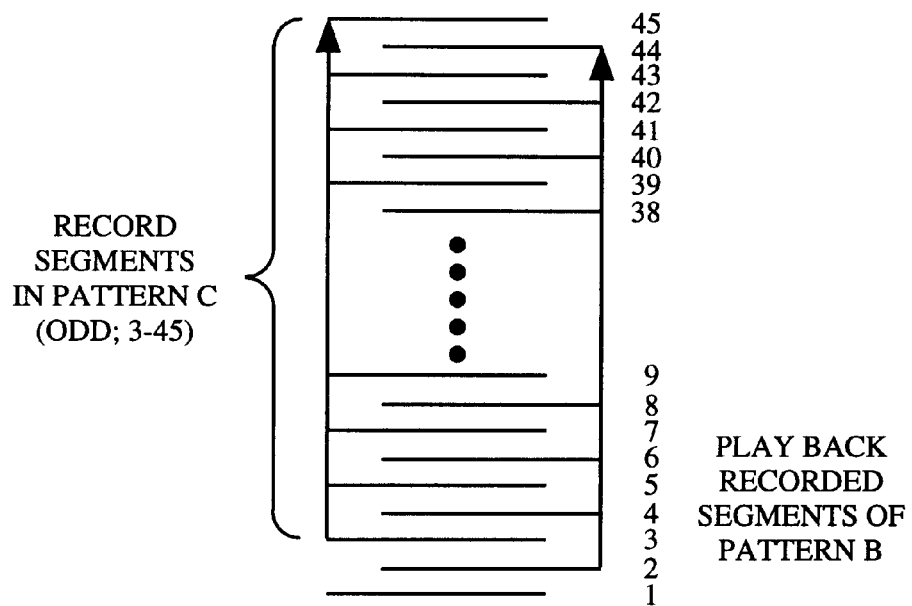
Figure 8:
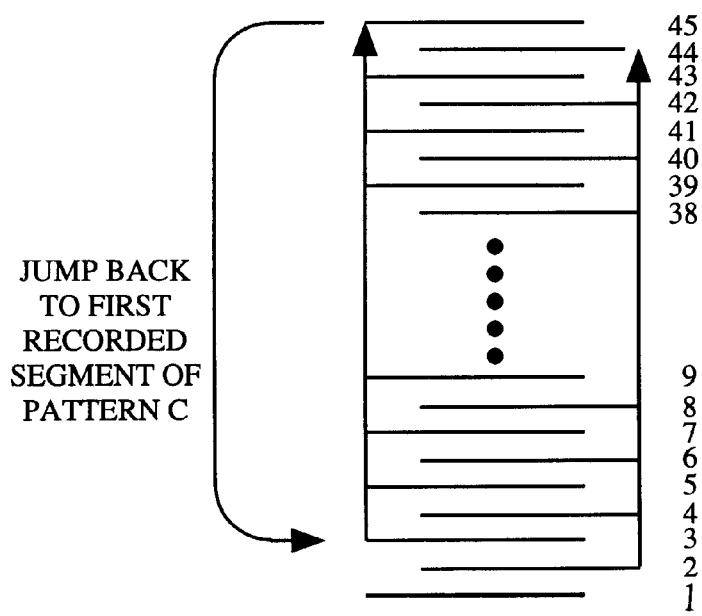
Figure 9:
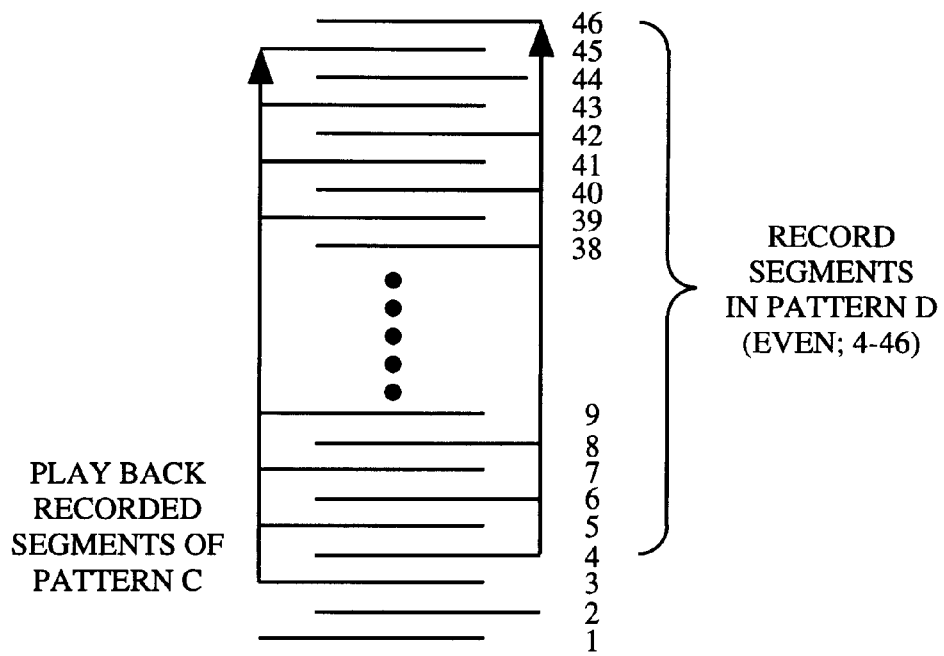

As even numbered segments 2–44 are played back, odd numbered segments 3–45 of pattern C are alternately recorded as shown in FIG. 7. After the even numbered segments 2–44 have been played back, and after the odd numbered segments 3–45 have been recorded, the pickup assembly jumps back as shown in FIG. 8 to segment 3, which is the first segment of pattern C that needs to be played back. As odd numbered segments 3–45 are played back, even numbered segments 4–46 of pattern D are alternately recorded as shown in FIG. 9.

Figure 10:
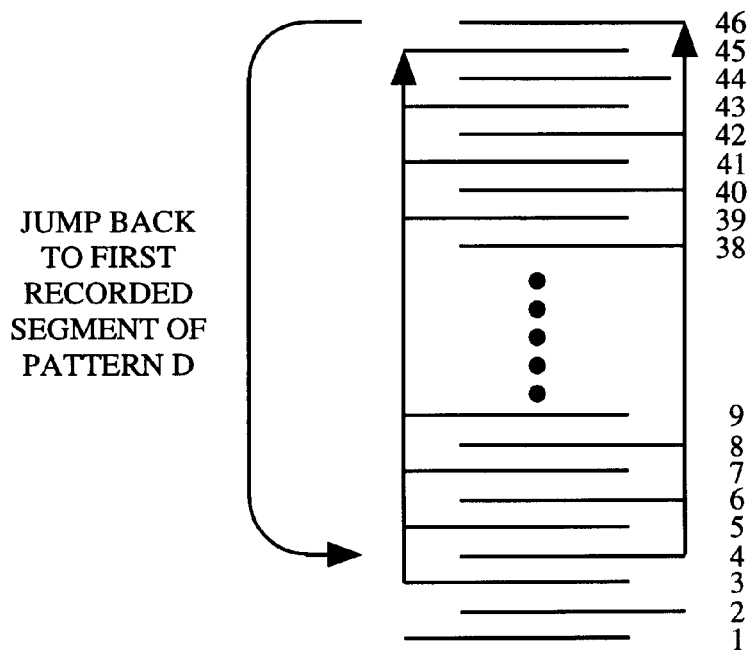
Figure 11:
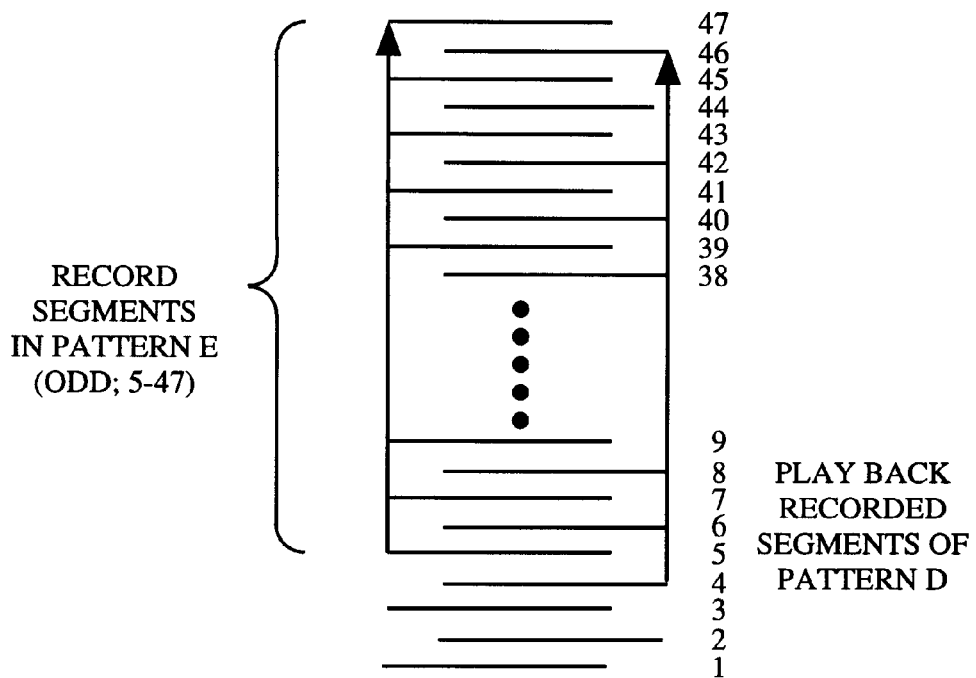
Figure 12:
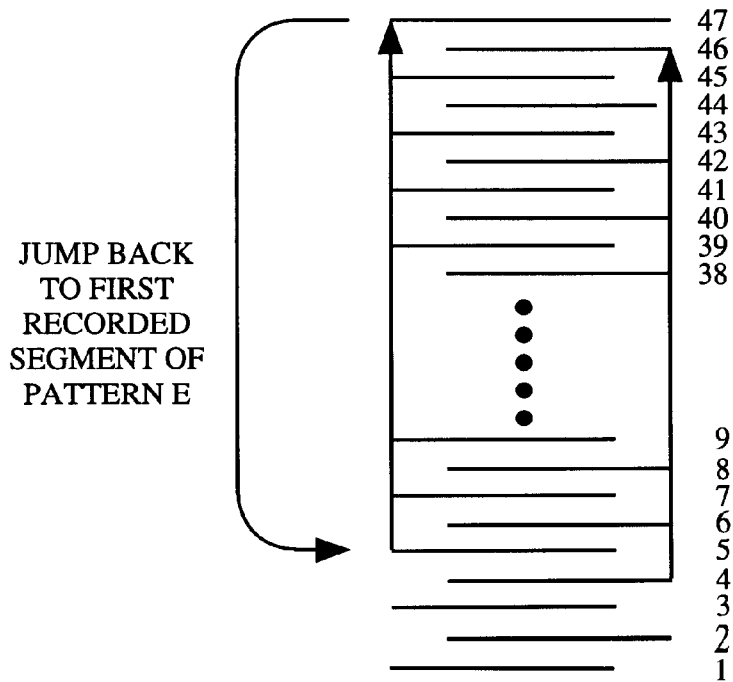

After the odd numbered segments 3–45 have been played back, and after the even numbered segments 4–46 have been recorded, the pickup assembly jumps back as shown in FIG. 10 to segment 4, which is the first segment of pattern D that needs to be played back. As even numbered segments 4–46 are played back, odd numbered segments 5–47 of pattern E are alternately recorded as shown in FIG. 11. After the even numbered segments 4–46 have been played back, and after the odd numbered segments 5–47 have been recorded, the pickup assembly jumps back as shown in FIG. 12 to segment 5, which is the first segment of pattern E that needs to be played back.

After achieving steady state operation of the buffers, the process can be summarized by the steps of: after playing back the recorded segments of the first pattern, jumping back to the first recorded segment of the second pattern; and, alternately playing back the recorded segments of the second pattern and recording the program in a third pattern of segments by overwriting the segments of the first pattern. The preceding steps are repeated for further patterns of segments until termination of the program.

It is believed that jump times as long as 0.9 seconds, for example, can be accommodated by buffers of the size noted. The time duration of the jump will include the time required for jumping as well as the time required for resynchronizing with the disk medium. Jumps after the first jump will be completed more quickly because the buffers will already be operating in the steady state condition. Accordingly, there will be no interruption of the played back material as the reading from and writing to the disk medium alternates, thus assuring a seamless presentation of the program material, wherein the recording and playing back appears to be simultaneous.

The process continues until the program presentation terminates. If the end of the track is reached before the program terminates, a routine can be provided to jump back to the beginning of the track, or any other location on the track to continue the alternate periods of recording and playing back until the program does terminate. The alternate recording and playing back is summarized in the table of FIG. 13.

The method of operation is shown in flow chart 200 in FIG. 15, with emphasis on the buffer management. A pause begins at step 202. It is necessary to assure that the segments of the first pattern (pattern A) will be decoded at the desired constant rate, for example 5 megabits/second. It is therefore necessary to encode the segments of the first pattern at the constant bit rate because the decoder automatically decodes at the same rate at which encoding took place. Accordingly, the bit rate for the encoder is set to the desired constant bit rate in accordance with step 204. It will be appreciated that the decoder is not needed until after the pause has been terminated. Moreover, as explained more fully below, having the decoder turned off when the pause terminates can be helpful in filling the track buffer more quickly. Accordingly, it is presently preferred to turn off the decoder after the pause begins, in accordance with step 206.

The device then records a first pattern of segments onto alternate segments on the track of the disk medium in accordance with step 208. As long as the pause has not been terminated, decision block 210 returns the method to step 208 by path 213 and waits. When the pause has been terminated, the method branches on path 211 to step 212, in accordance with which the device completes recording the last segment of the first pattern. Thereafter, the pickup assembly jumps back to the first segment of the first pattern in accordance with step 214. As the jump proceeds, the record buffer begins filling with the segments that will become the second pattern, in accordance with step 216. This is necessary to assure that no incoming program material is lost during the jump.

In accordance with the inventive arrangements, the playback operation after termination of the pause is seamless. This means that once playback commences, playback can never be interrupted. Accordingly, the track buffer must never be in an underflow condition or the decoder will run out of material to decode and the playback will be interrupted. At the same time, in order to be certain that no program material is lost during recording, the record buffer must never be in an overflow condition, or the output of the encoder will have no place to be stored. The complementary management of the buffers in accordance with the inventive arrangements satisfies these operating conditions of the buffers. However, the record and track buffers must first be initialized for the complementary operation in conjunction with the first jump. Initialization is accomplished in the illustrated embodiment as soon as the sum of the number of segments in both buffers is equal to three. As soon as that occurs, the device can alternately record and playback segments in accordance with the inventive arrangements. It will be appreciated that more than one process can be implemented to achieve initialization. The initialization process described in connection with FIG. 15 is presently preferred.

As the record buffer fills, decision step 218 queries whether the jump has been completed. If not, the method branches back on path 221 and waits. When the jump is done the method branches on path 219. The pickup assembly reads the first segment of pattern A from the disk medium and the track buffer begins filling with data in accordance with step 222. The record buffer continues to be filled.

As the track buffer fills, decision step 222 queries whether the sum of the number of segments in both buffers has become equal to three during step 220, that is, before the first segment has been completely written into the track buffer. If not, the first segment will be entirely written into the track buffer. In this case, the method branches on path 223 to step 224, in accordance with which writing the first segment into the track buffer is finished, and thereafter, writing into the track buffer stops. At this instant, there is no reading from the disk or writing to the disk. Decision step 226 then queries whether the sum of the number of segments in both buffers has become equal to three after step 224, that is, while the decoder is turned off, the track buffer continues to hold only the first segment and the record buffer continues to fill. If not, the method branches back on path 229 and waits. The record buffer will eventually be filled with two segments. At this instant the sum of the number of segments in both buffers has become equal to three, and the buffers are thus initialized. The method then branches on path 227 to step 232, in accordance with which the decoder is turned back on. Thereafter, the device can begin reading from the record buffer and writing onto the disk medium, and can begin reading from the track buffer and writing into the decoder, in accordance with steps 234 and 236. After writing the first segment of the second pattern from the record buffer onto the disk medium, the second segment of the first pattern is read from the disk medium and written into the track buffer. The alternate reading and writing of the inventive arrangements is thus established.

Returning to decision block 222, it is possible that the record buffer will be filled with more than two segments, but less than three segments, before the first segment read from the disk medium is completely written into the track buffer. Whether or not this will occur depends largely on the time duration of the first jump of step 214. When this occurs, the buffers will be initialized before the first segment is completely written into the record buffer, because the sum of the number of segments in both buffers will be equal to three. Once the buffers are initialized, writing into and reading from both buffers needs to be enabled. Accordingly, and at that instant, the method branches on path 225 to step 228, in accordance with which the decoder is turned on. After turning on the decoder, it is still necessary to finish writing the first segment into the track buffer in accordance with step 230. Thereafter, the device can begin reading from the record buffer and writing onto the disk medium, and can begin reading from the track buffer and writing into the decoder, in accordance with steps 234 and 236. After writing the first segment of the second pattern from the record buffer onto the disk medium, the second segment of the first pattern is read from the disk medium and written into the track buffer. The alternate reading and writing of the inventive arrangements is thus established.

Irrespective of the process for initializing the buffers, a certain period of time is required for preparation for the next jump at a given bit rate. In the illustrated embodiment, 1 megabit/second is available for the preparation process. This period of time may not be available if the pause is too short, for example less than 10 seconds in length. One source of such a pause is accidental viewer selection of the feature. Another possible cause is viewer initiation of a second pause immediately after initialization following a first pause. Accordingly, it may be necessary to limit all pauses to a minimum duration, for example through the control program.

After steps 234 and 236, the device alternately reads the segments of the first pattern from the disk medium and writes the segments of the second pattern onto the disk medium, and fills and empties the buffers in a complementary manner in accordance with step 238. This process corresponds to FIGS. 3–5.

The complementary operation of the buffers must be understood as referring to the overall operation of the buffers and not to a condition that is necessarily maintained instantaneously, at all times. In the illustrated embodiment, during the recording onto alternate segments, the record buffer is filled by the encoder at 5 megabits/second, the chosen output rate of the encoder. If the total write to disk bit rate capability is 11 megabits/second as described, then the record buffer is being emptied at a net 6 megabits/second due to the difference between the filling and emptying rates. During the writing operation the track buffer is being emptied at 5 megabits/second, the same rate as the decoding rate. Both buffers are being emptied, so instantaneously, the sum of the number of segments in both buffers is decreasing. After the segment is written to the disk, a segment is read from the disk and written into the track buffer, also at 11 megabits/second as described. The track buffer is being emptied at 5 megabits/second. Accordingly, when the disk is being read, the track buffer is being filled at a net 6 megabits/second due to the difference between the filling and emptying rates. During the reading operation the record buffer is being filled at 5 megabits/second. Both buffers are being filled, so instantaneously, the sum of the number of segments in both buffers is increasing. Nevertheless, when the operation of the buffers is considered at the same instant in the read/write cycle, for example always at the beginning of a read or a write operation, the advantageous complementary nature of the operation is apparent.

In most cases the second pattern will not be the last pattern, but it is possible. Accordingly, decision block 240 queries whether the last pattern has been played. If not, the method branches on path 241 to step 242, in accordance with which the pickup assembly jumps back to the first segment of the next pattern that needs to be played back. After the jump, because the buffers were already initialized, the device can immediately alternately read and write, and alternately record and play back, in accordance with step 244. In accordance with the inventive arrangements, the reading and writing and the recording and playing back are implemented as the buffers are filled and emptied in a complementary manner in accordance with the inventive arrangements.

Steps 240, 242 and 244 are repeated until decision block 240 recognizes that the last pattern has been recorded and played back. The method then branches on path 243 to step 246. Step 246 notes that processing of the last pattern corresponds to the end of the program. Default operation of the buffers resumes. The method ends at step 248.

The jumping back shown in FIGS. 4, 6, 8, 10 and 12 is summarized in the table of FIG. 14. It can be seen that the first jump is back to segment 1, the second jump is back to segment 2, the third jump is back to segment 3, the fourth jump is back to segment 4, the fifth jump is back to segment 5, and so on. Each jump back results in a re-recording or rewriting of the segments on the disk. In order to prevent premature exhaustion of the disk medium, it can be seen that the method advantageously precesses by at least one segment each time the method jumps back. The first jump back writes or rewrites onto the odd-numbered segments 1–43. The second jump back skips segment 1 and writes or rewrites even numbered segments 2–44. The third jump back skips segment 2 and rewrites odd numbered segments 3–45, and so on.

During the pause, unrecorded gaps in the track are formed between the recorded segments. It is possible to jump from the end of one recorded segment to the position on the track where the next segment is to be written. However, it is easier in most cases to simply let the disk medium spin under the pickup assembly, scanning the track until the next segment is reached.

It is often necessary to jump back one revolution of the track due to the rotational speed of the disk medium being higher than needed. Such jumps are a third kind of jump with respect to those jumps described above. Such jumps are very brief even for a DVD device, and such jumps do not require extraordinary buffer management or large buffer sizes compared to the long jumps which can be necessary for a record during record and playback (or record during pause and playback) feature.

It will be appreciated that precessing during recording of rewritable disk media is advantageous for repeated recording operations other than the record during pause and playback feature taught herein in accordance with the inventive arrangements.

Subsequent record during pause and playback operations are also possible in accordance with the inventive arrangements, and can be implemented substantially as explained above, except that two or more sets of periodic jumps can be necessary.

Overall, the inventive arrangements as described above provide a new kind of DVD feature that enables a viewer to interrupt a program, and after the interruption, to resume viewing the program in a seamless manner without any delay and without missing any program content. Moreover, the inventive arrangements can be implemented with a basic rewritable disk medium device, for example a rewritable DVD device, that is also capable of playing prerecorded DVD's and that is otherwise capable of conventional recording.

What is claimed is:

1. A method for recording a program during pausing and playing back the program utilizing a disk medium, comprising the steps of:
   (a) upon receiving a command to initiate a pause, recording said program onto a track on said disk medium as a first pattern of recorded segments alternating with a second pattern of unrecorded segments;
   (b) jumping back to the first recorded segment of said first pattern upon receiving a command to terminate said pause; and,
   (c) alternately playing back said recorded segments of said first pattern and recording said program onto said unrecorded segments of said second pattern.

2. The method of claim 1, further comprising the steps of:
   (d) storing program portions ready to be written onto said disk medium in a first buffer and other portions read from said disk medium in a second buffer; and,
   (e) filling and emptying said first and second buffers in a complementary manner.

3. The method of claim 2, further comprising the steps of:
   (f) prior to said jumping step, emptying said first buffer and filling said second buffer; and,
   (g) during said jumping step, filling said first buffer and emptying said second buffer.

4. The method of claim 3, comprising the step of:
   (h) overwriting the segments of said first pattern of segments, except for at least the first segment of said first pattern of segments, whereby said overwriting is precessed along said track.

5. The method of claim 1, further comprising the steps of:
   (d) after playing back said recorded segments of said first pattern, jumping back to the first recorded segment of said second pattern;
   (e) alternately playing back said recorded segments of said second pattern and recording said program in a third pattern of segments by overwriting the segments of said first pattern; and,
   (f) repeating said steps (d) and (e) for further patterns of segments until termination of said program.

6. The method of claim 5, further comprising the steps of:
   (g) storing program portions ready to be written onto said disk medium in a first buffer and read from said disk medium in a second buffer; and,
   (h) filling and emptying said first and second buffers in a complementary manner.

7. The method of claim 6, further comprising the steps of:
   (i) prior to each said jumping step, emptying said first buffer and filling said second buffer; and,
   (j) during each said jumping step, filling said first buffer and emptying said second buffer.

8. The method of claim 7, comprising the step of:
   (k) overwriting the segments of said first and further patterns of segments, except for at least the first segment of said first and further patterns of segments, whereby said overwriting precesses along said track.

9. The method of claim 1, comprising the steps of:
   (d) storing program portions ready to be written onto said disk medium in a first buffer and other portions read from said disk medium in a second buffer;
   (e) initializing said first and second buffers for operation in a complementary manner; and,
   (e) filling and emptying said first and second buffers in said complementary manner.

10. The method of claim 1, comprising the step of encoding said program as packet stream data prior to said writing and decoding said packet stream data after said reading.

11. The method of claim 1, comprising the step of encoding said program as packet stream data prior to said storing in said first buffer and decoding said packet stream data after said storing in said second buffer.

12. The method of claim 1, comprising the steps of:
    recording said program signal along a spiral track; and,
    making said unrecorded segments longer by at least approximately one-half revolution of said spiral track.

13. The method of claim 1, further comprising the step of recording said program on a digital video disk.

14. The method of claim 5, further comprising the step of recording said program on a digital video disk.

15. The method of claim 1, comprising the step of:
    (d) overwriting the segments of said first pattern of segments, except for at least the first segment of said first pattern of segments, whereby said overwriting is precessed along said track.

16. An apparatus for recording a program during pausing and playing back the program utilizing a disk medium, the apparatus comprising:
    a first signal processing path for receiving said program;
    a pickup assembly for writing data onto said disk medium and reading data from said disk medium
    a servo system for said pickup assembly;
    a second signal processing path for playing back said program;
    means for receiving control commands;
    a controller having a first mode of operation for recording said program initiated responsive to a command to initiate a pause, a second mode of operation initiated responsive to a command to terminate said pause and a third mode of operation for playing back and recording said program;
    in said first mode of operation, said pickup assembly being positioned to record said program onto a track on said disk medium as a first pattern of recorded segments alternating with a second pattern of unrecorded segments;
    in said second mode of operation, said pickup assembly being jumped back to the first recorded segment of said first pattern; and,
    in said third mode of operation, said pickup assembly being positioned for alternately playing back said recorded segments of said first pattern and recording said program onto said unrecorded segments of said second pattern.

17. The apparatus of claim 16, further comprising:
    a first buffer for storing program portions ready to be written onto said disk medium;
    a second buffer for storing other program portions read from said disk medium; and,
    buffer control means for initializing said first and second buffers for operation in a complementary manner, and thereafter, for filling and emptying said first and second and buffers in said complementary manner.

18. The apparatus of claim 16, wherein during said third mode of operation, said pickup assembly is positioned to overwriting the segments of said first pattern of segments, except for at least the first segment of said first pattern of segments, whereby said overwriting is precessed along said track.

* * * * *